(12) United States Patent
Yoon

(10) Patent No.: US 11,395,721 B1
(45) Date of Patent: Jul. 26, 2022

(54) BRACKET FOR SELF-LIGATING CORRECTION

(71) Applicant: BIOCETEC CO., LTD., Seoul (KR)

(72) Inventor: Sung Hee Yoon, Seoul (KR)

(73) Assignee: BIOCETEC CO., LTD., Seoul (KR)

( * ) Notice: Subject to any disclaimer, the term of this patent is extended or adjusted under 35 U.S.C. 154(b) by 0 days.

(21) Appl. No.: 17/470,023

(22) Filed: Sep. 9, 2021

(51) Int. Cl.
*A61C 7/28* (2006.01)
(52) U.S. Cl.
CPC .................................... *A61C 7/287* (2013.01)
(58) Field of Classification Search
CPC ........... A61C 7/28; A61C 7/285; A61C 7/287; A61C 7/30
See application file for complete search history.

(56) References Cited

U.S. PATENT DOCUMENTS

| | | | |
|---|---|---|---|
| 6,267,590 B1 * | 7/2001 | Barry | A61C 7/14 433/20 |
| 8,113,828 B1 | 2/2012 | Greenfield | |
| 10,085,824 B2 | 10/2018 | Payne | |
| 2010/0178629 A1 * | 7/2010 | Oda | A61C 7/125 433/14 |
| 2015/0223913 A1 * | 8/2015 | Yick | A61C 7/287 433/10 |
| 2017/0119500 A1 * | 5/2017 | Ruiz-Vela | A61C 7/30 |
| 2020/0390525 A1 * | 12/2020 | Chen | A61C 7/14 |

FOREIGN PATENT DOCUMENTS

KR  10-2007-0085037 A  8/2007
KR  10-1693239 B  12/2016

* cited by examiner

*Primary Examiner* — Edward Moran
(74) *Attorney, Agent, or Firm* — Patent Office of Dr. Chung Park

(57) ABSTRACT

Disclosed is a bracket for self-ligating correction fixed to teeth and used for orthodontic treatment. The disclosed bracket for self-ligating correction includes a bracket body having a slot into which a wire is inserted and formed in a first direction, and a guide part formed in a second direction crossing the first direction, a door reciprocally installed on the guide part of the bracket body to open and close the slot, and a clamper that moves the door while elastically deforming when a predetermined force is applied to the door in the second direction. The clamper includes a coupling pin installed on the bracket body so as to allow one end to protrude onto the guide part, and an elastic loop installed on one side of the door facing the guide part and including a hollow single closed curve.

5 Claims, 11 Drawing Sheets

[FIG. 1]
Prior Art
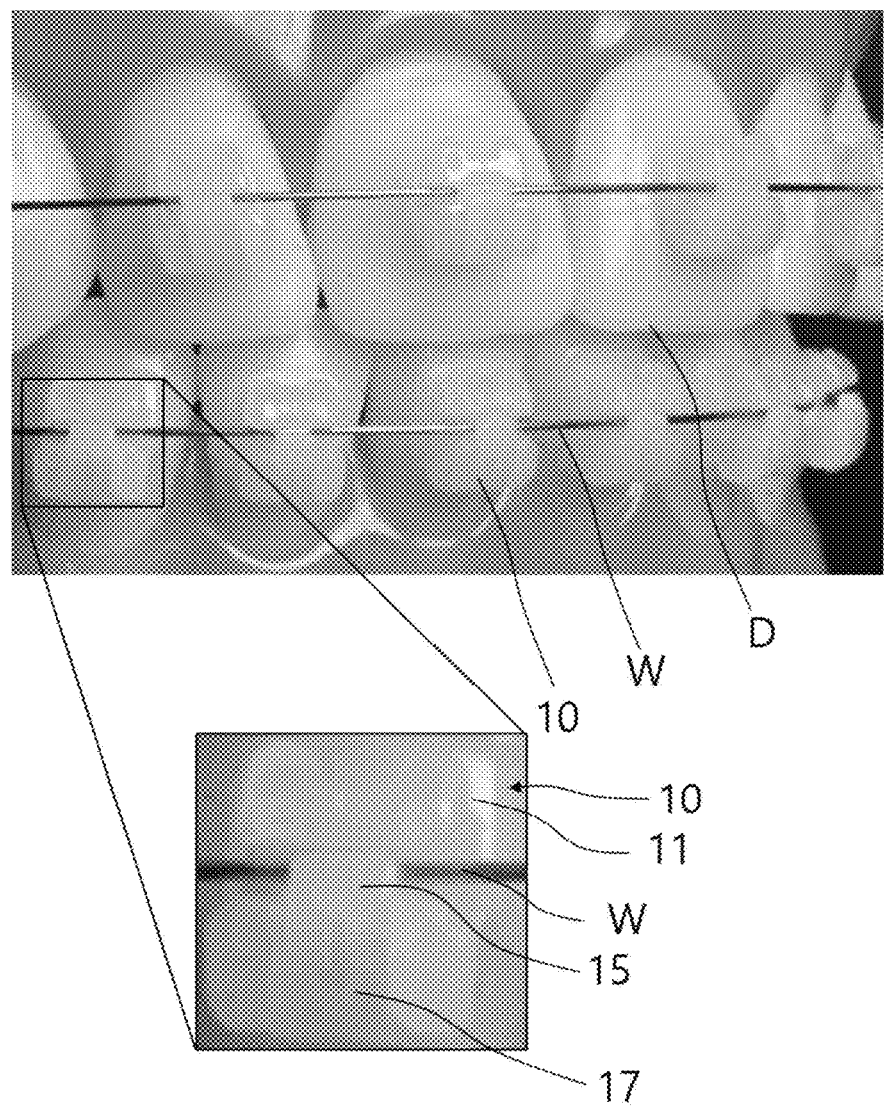

[FIG. 2]
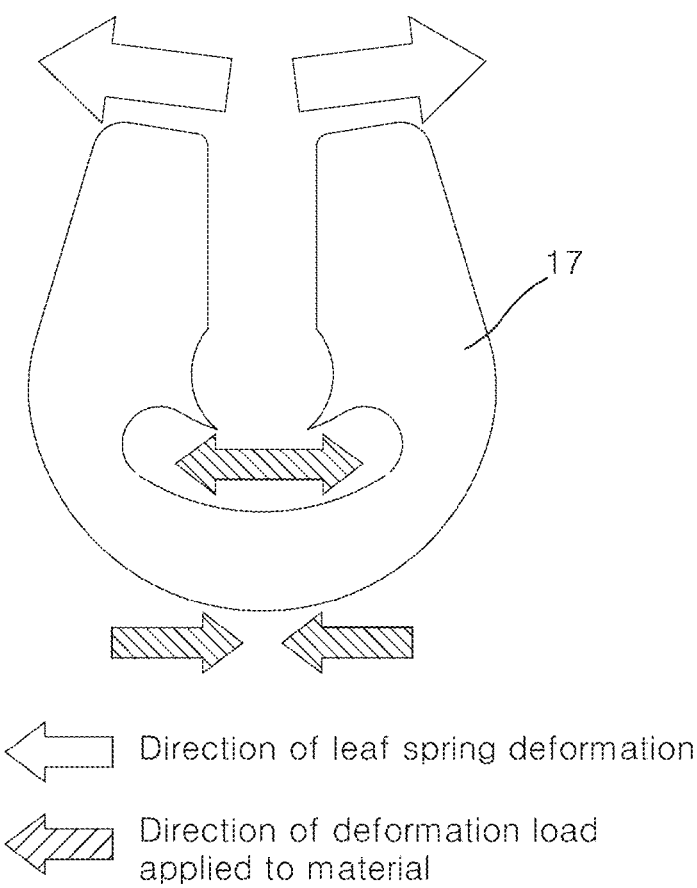

[FIG. 3]
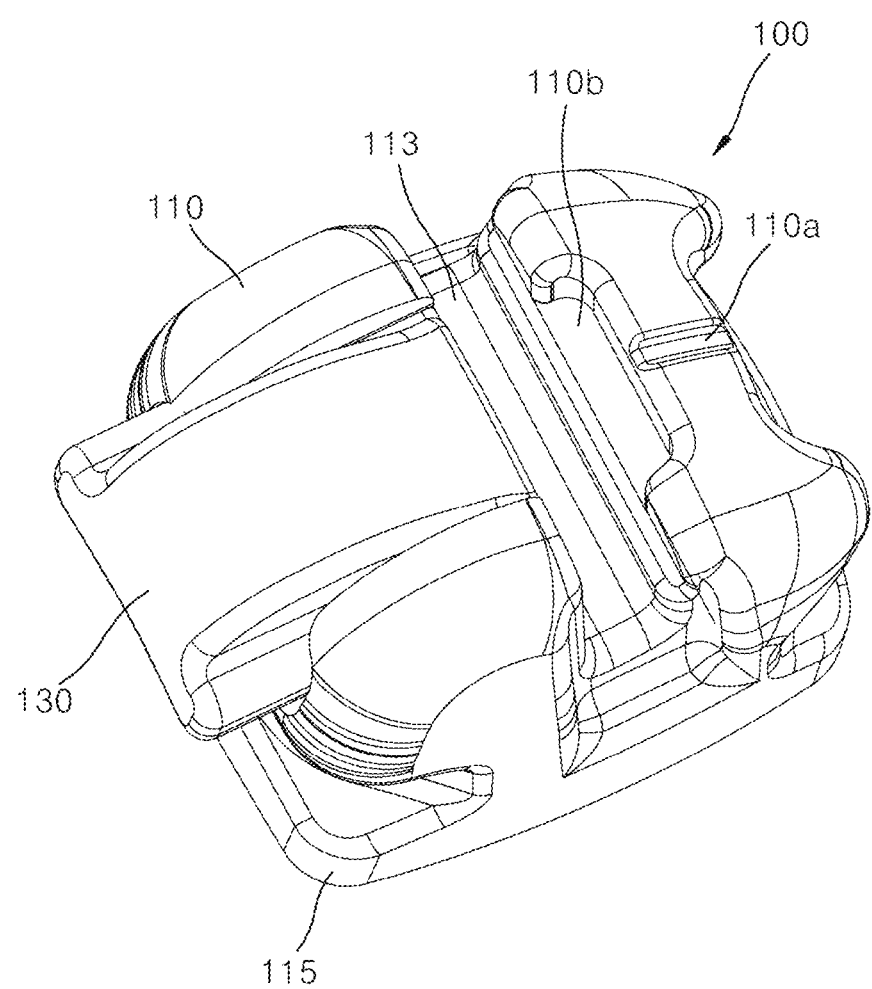

[FIG. 4]
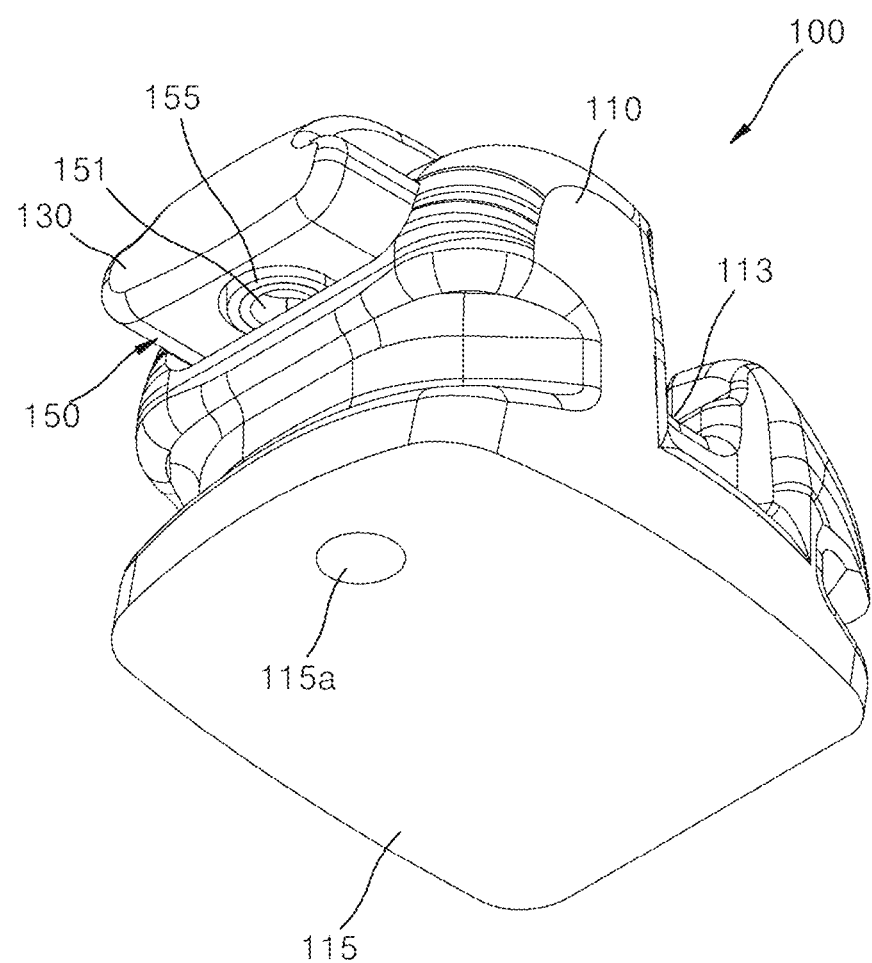

[FIG. 5]
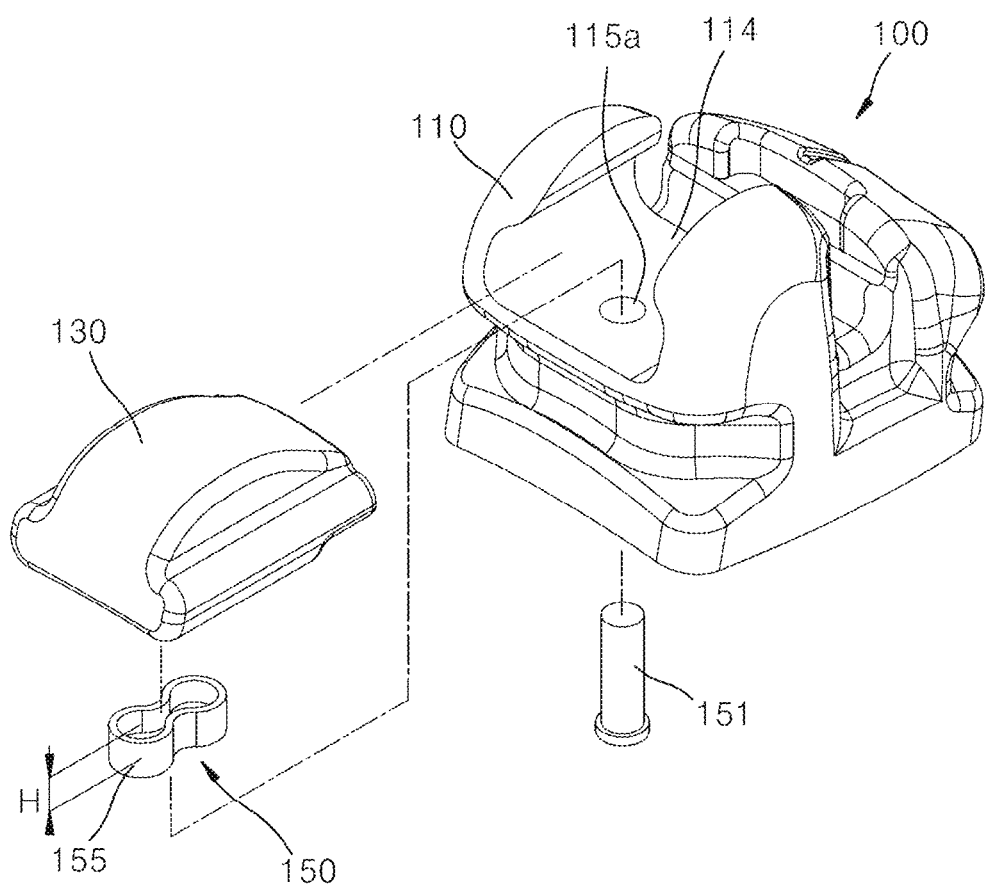

[FIG. 6]
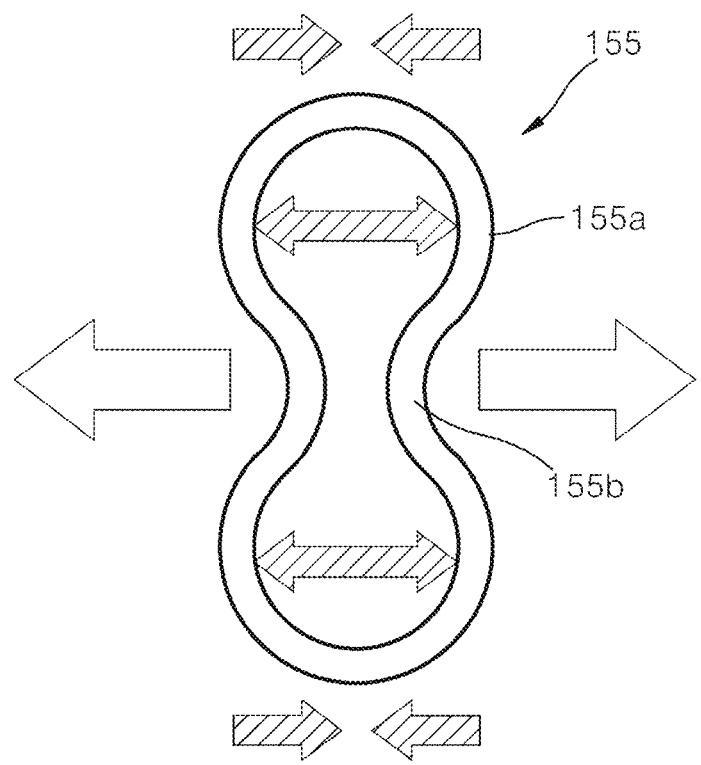

[FIG. 7A]
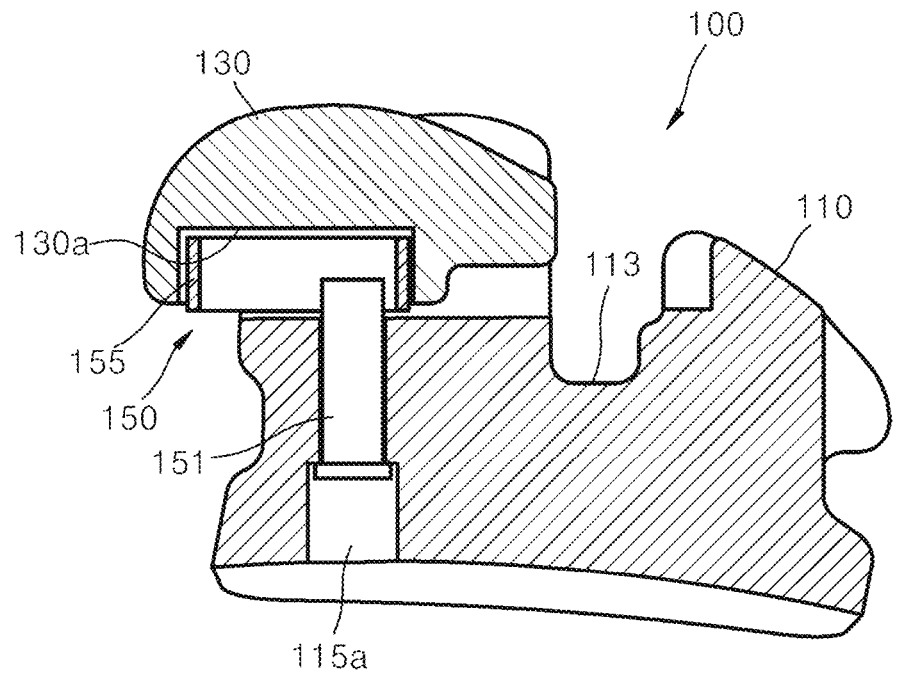
[FIG. 7B]
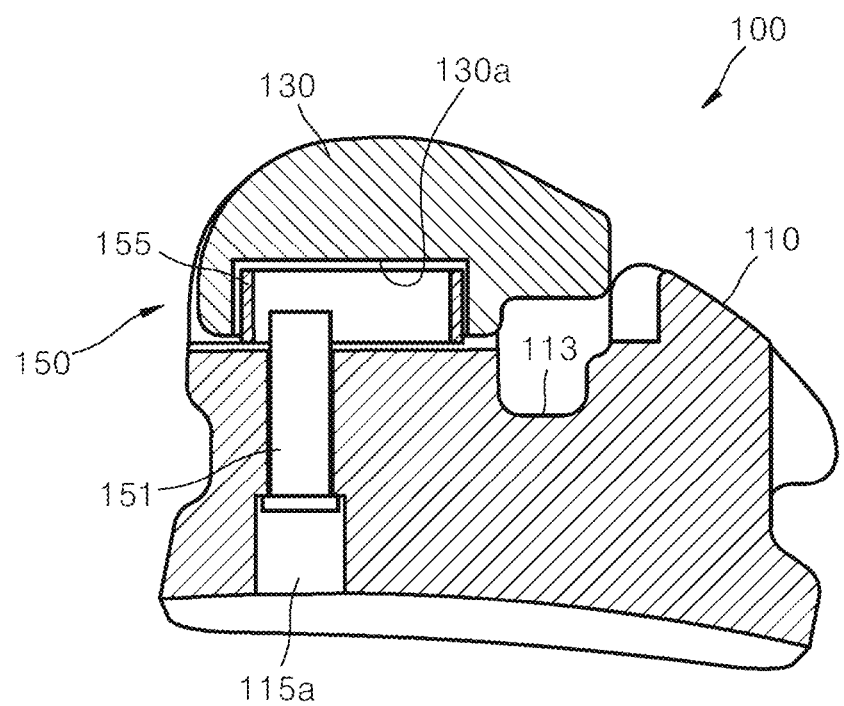

[FIG. 8]
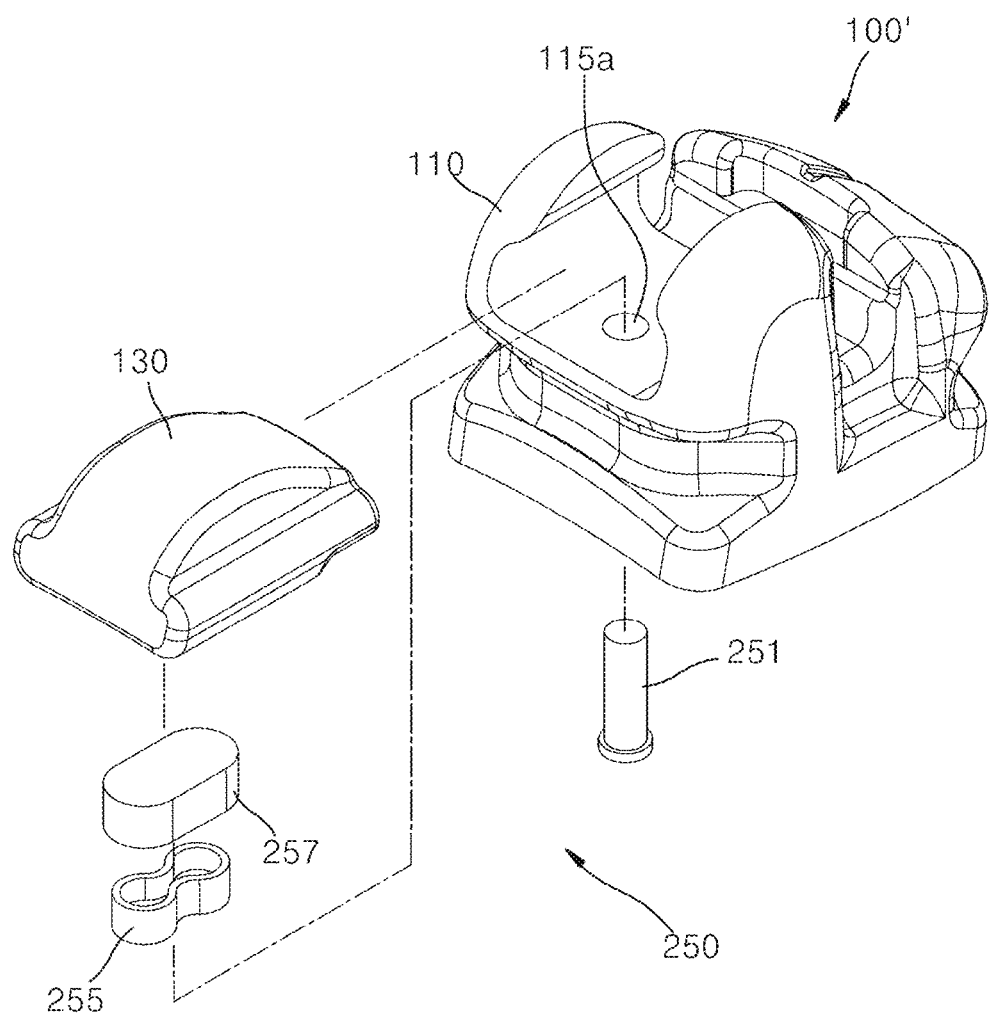

[FIG. 9A]
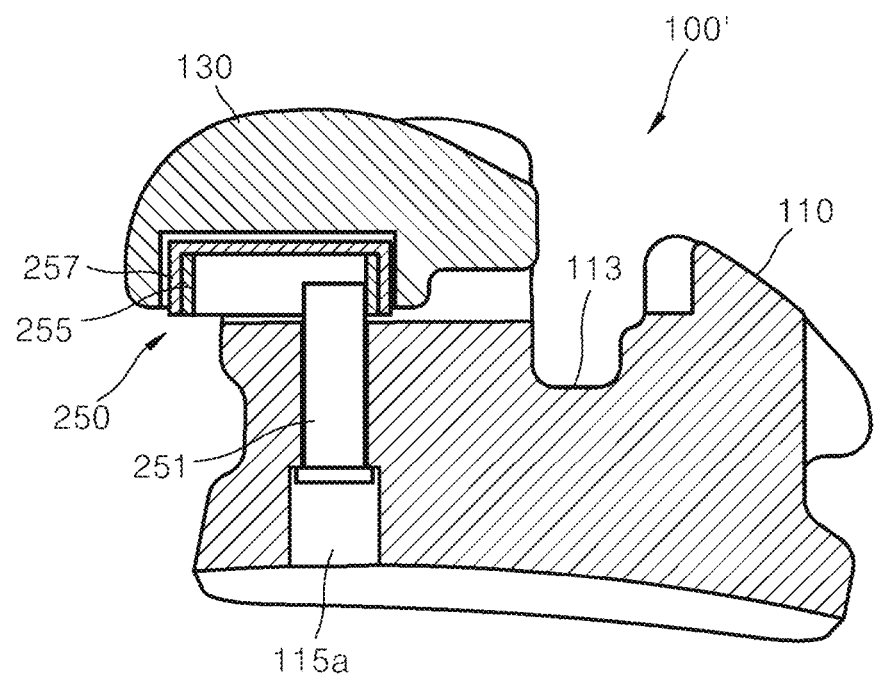
[FIG. 9B]
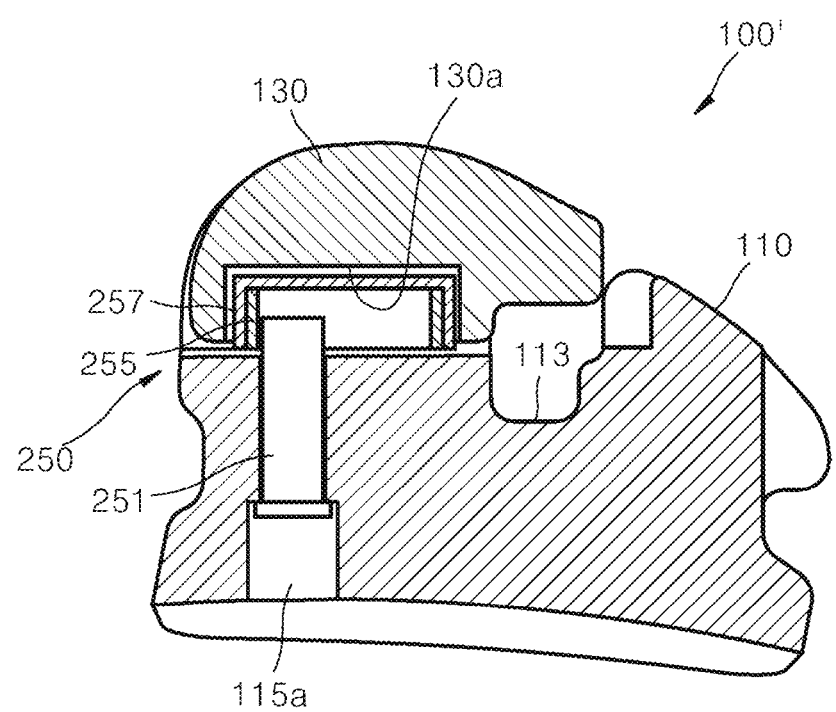

[FIG. 10]
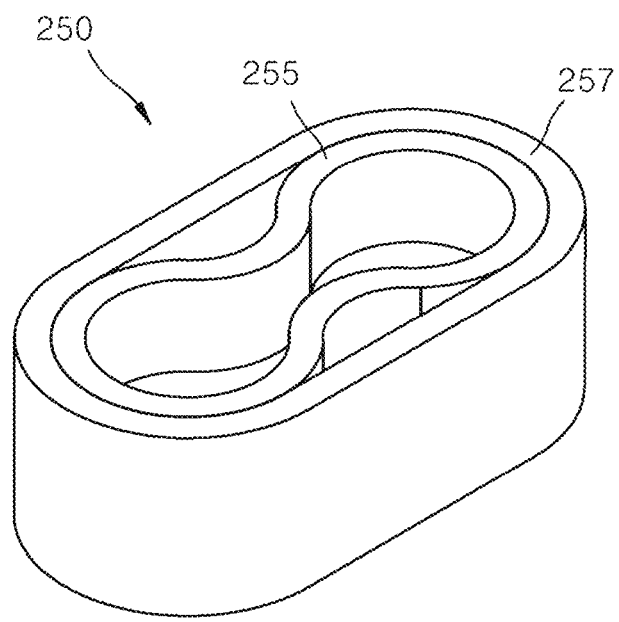
[FIG. 11]
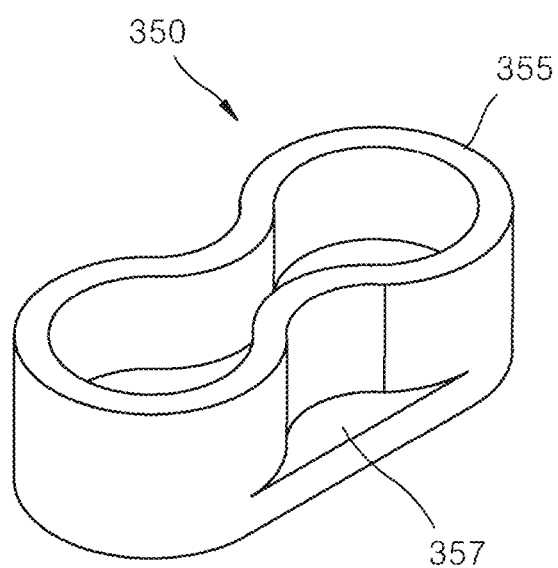

[FIG.12A]
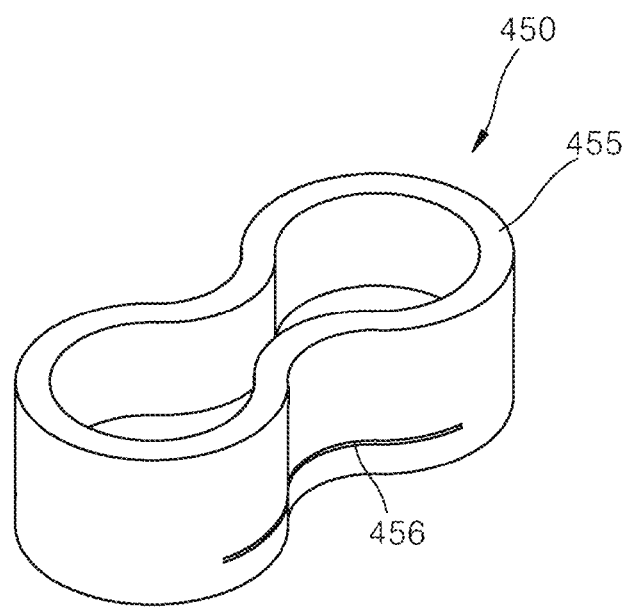
[FIG. 12B]
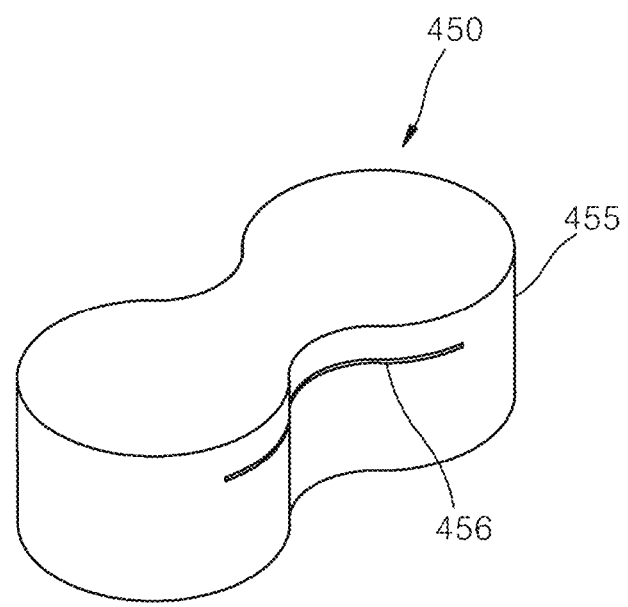

BRACKET FOR SELF-LIGATING CORRECTION

CROSS-REFERENCE TO RELATED APPLICATION

This application claims the benefit of Korean Patent Application No. 10-2021-0003605, filed on Jan. 11, 2021, in the Korean Intellectual Property Office, the disclosure of which is incorporated herein in its entirety by reference.

BACKGROUND

1. Field

The present disclosure relates to a bracket for self-ligating correction, and more particularly, to a bracket for self-ligating correction used for orthodontic treatment, and more particularly, to a bracket for self-ligating correction having a door structure.

2. Description of the Related Art

Orthodontic treatment refers to a procedure in which a ligation bracket having a slot is attached to the surface of a tooth, and an orthodontic wire is ligated in the slot to correct malalignment. Among ligation brackets, a bracket for self-ligating correction may include a door that is installed to be opened and closed with respect to a bracket body so as to ligate orthodontic wires without an additional device.

FIG. 1 is a photo showing a tooth model treated with a conventional self-ligating bracket having a door structure, and FIG. 2 is a view showing a clamper applied to the self-ligating bracket of FIG. 1.

Referring to FIGS. 1 and 2, the conventional self-ligating bracket 10 is attached to the surface of a tooth D, and includes a bracket body 11, a door 15 and a clamper 17. The bracket body 11 has a slot into which an orthodontic wire (W) is ligated. The door 15 is installed at the bracket body 11 so as to be opened and closed and is fixed in the open or closed position by the clamper 17.

The clamper 17 is installed between the door 15 and the bracket body 11, and may be composed of a leaf spring having a horseshoe structure as shown in FIG. 2. Therefore, when a predetermined force is applied in the direction in which the door 15 is opened or closed, the leaf spring 17 is elastically deformed to open and close the door 15.

The clamper 17 is installed between the door 15 and the bracket body 11. The clamper 17 formed of the leaf spring structure as shown in FIG. 2 may be easily elastically deformed in the process of opening and closing the door 15. That is, while the direction in which the deformation load applied to the material, such as tension/compression, is received is concentrated on the closed ring side of the leaf spring 17, the deformation direction of the leaf spring 17 is concentrated on the open position. Accordingly, during the deformation process for opening and closing the leaf spring 17, the elastic restoration performance of the leaf spring may be lost. Therefore, if the door opening/closing function is lost, it may be necessary to replace the door with a new product. In this case, the treatment time may be extended, and the cost may be increased. In addition, bracket body removal and re-treatment processes may be added, which may cause tooth damage.

In addition, whereas the bracket body 11 is generally made of a translucent ceramic material, the leaf spring 17 is made of a metallic material having a black color, and thus, as shown in the enlarged view of FIG. 1, the leaf spring 17 may be exposed to the outside of the bracket body 11 in the form of black spots. This may offset the advantages of a ceramic bracket body used for aesthetic purposes. Accordingly, there is a problem in that the satisfaction of the patient is lowered.

SUMMARY

The present invention has been devised in view of the above problems, and an object of the present invention is to provide a bracket for self-ligating correction constructed such that the amount of elastic deformation of a clamper can be minimized in the process of opening and closing a door with respect to a bracket body.

In addition, another object of the present invention is to provide a bracket for self-ligating correction constructed such that a clamper is not visible from the outside of the self-ligating bracket. clamper is not visible from the outside of the self-ligating bracket.

In order to achieve the above objects, a bracket for self-ligating correction according to the present invention comprises: a bracket body having a slot into which a wire is inserted and formed in a first direction, and a guide part formed in a second direction crossing the first direction; a door reciprocally installed on the guide part of the bracket body to open and close the slot; and a clamper that moves the door while elastically deforming when a predetermined force is applied to the door in the second direction. Here, the clamper includes: a coupling pin installed on the bracket body so as to allow one end to protrude onto the guide part; and an elastic loop installed on one side of the door facing the guide part and including a hollow single closed curve.

The elastic loop, which is a place where the coupling pin is located in an open position and a closed position of the door, may include a parking part separated into at least two spaces and a neck part that is located between the spaces of the parking part and is elastically deformed during relative motion between the coupling pin and the elastic loop.

In addition, the elastic loop elastic loop may be formed to a height of 3 mm or less. In addition, the elastic loop may be formed to a thickness in the range of 50 μm to 1 mm.

The elastic loop may include a base material made of a plastic material, and a coating material made of a metal material coated on the base material to a predetermined thickness. Here, the coating material may be formed to a thickness ranging from 10 nm to 2 μm.

The clamper may further include a cap member which is provided between the lower surface of the door and the elastic loop and covers the elastic loop.

In addition, the elastic loop may be constructed such that one side thereof facing the coupling pin is open and the other side thereof is closed.

In addition, a slit cut by a predetermined length along the side of the elastic loop may be formed in at least one side of the elastic loop.

As described above, the bracket for self-ligating correction according to the present invention constructs an elastic loop elastically deformed in the process of opening and closing the door in a closed curve shape, so that the direction of the deformation load is symmetrical. Accordingly, when opening and closing the door, the elastic loop may prevent the elastic recovery performance from being significantly deteriorated during the elastic deformation and restoration process. Therefore, the door opening and closing function may be prevented from being lost, or even if the door opening and closing function is lost, the probability of loss in the door opening and closing function may be significantly reduced.

In addition, the bracket for self-ligating correction according to the present invention, in constructing a clamper, a cap member or a cap part are provided, so that the elastic loop and the coupling pin are not visible from the outside of the door, thereby improving aesthetics.

BRIEF DESCRIPTION OF THE DRAWINGS

These and/or other aspects will become apparent and more readily appreciated from the following description of the embodiments, taken in conjunction with the accompanying drawings in which:

FIG. 1 is a photo showing a tooth model treated with a conventional self-ligating bracket having a door structure;

FIG. 2 is a view showing a clamper applied to the self-ligating bracket of FIG. 1;

FIG. 3 is a perspective view from above of a self-ligating bracket according to an embodiment of the present invention;

FIG. 4 is a perspective view from below of a self-ligating bracket according to an embodiment of the present invention;

FIG. 5 is an exploded perspective view showing a self-ligating bracket according to an embodiment of the present invention;

FIG. 6 is a view showing the direction of the force applied to an elastic loop of a self-ligating bracket according to an embodiment of the present invention;

FIG. 7A is a cross-sectional view of a door of a self-ligating bracket in an open state according to an embodiment of the present invention;

FIG. 7B is a cross-sectional view of a door of a self-ligating bracket in a close state according to an embodiment of the present invention;

FIG. 8 is an exploded perspective view showing a self-ligating bracket according to another embodiment of the present invention;

FIG. 9A is a cross-sectional view of a door of a self-ligating bracket in an open state according to another embodiment of the present invention;

FIG. 9B is a cross-sectional view of a door of a self-ligating bracket in a close state according to another embodiment of the present invention;

FIG. 10 is a bottom perspective view showing a state in which an elastic loop and a cap are combined in the clamper of FIG. 8;

FIG. 11 is a perspective view showing a modified example of the clamper of FIG. 8; and FIGS. 12A and 12B are perspective views showing another modified example of the clamper of FIG. 8 in different directions.

DETAILED DESCRIPTION

Hereinafter, example embodiments of the present invention will be described in detail with reference to the accompanying drawings. In order to clearly explain the present invention in the drawings, parts irrelevant to the description are omitted, and the same reference numerals are used for the same or similar elements throughout the specification.

FIG. 3 is a perspective view from above of a self-ligating bracket according to an embodiment of the present invention, FIG. 4 is a perspective view from below of a self-ligating bracket according to an embodiment of the present invention, and FIG. 5 is an exploded perspective view showing a self-ligating bracket according to an embodiment of the present invention. FIG. 6 is a view showing the direction of the force applied to an elastic loop of a self-ligating bracket according to an embodiment of the present invention. FIGS. 7A and 7B are cross-sectional views of a door of a self-ligating bracket in open and close states according to an embodiment of the present invention.

Referring to the drawings, the bracket for self-ligating correction 100 according to an embodiment of the present invention includes a bracket body 110, a door 130 and a clamper 150.

The bracket body 110 includes a slot 113 and a guide part 114. An orthodontic wire (not shown) is inserted into the slot 113, and may be formed in a predetermined depth with respect to the bracket body 110 in the first direction. The slot 113 is formed such that both ends thereof have a wider inlet toward the outside, and thus the wire may be easily inserted into the slot 113. The guide part 114 is formed in a second direction crossing the first direction.

In addition, a positioning guide groove 110a and an instrument receiving part 110b may be formed in the bracket body 110. When the positioning guide groove 110a is attached to a tooth (not shown), a lower surface 115 of the bracket body 110 guides an attachment direction to allow the operator to easily grasp the attachment direction. The instrument receiving part 110b is formed to be recessed in the vicinity of the slot 113, and provides a separation space between the door 130 and the bracket body 110 when the door 130 is in the closed position. An opening mechanism (not shown) may optionally be inserted into the instrument receiving part 110b. Therefore, when the door 130 is to be opened to be an open position, by applying a force in the direction in which the door 130 for inserting the opening mechanism into the instrument receiving part 110b opens, the door 130 may be moved in the second direction.

The door 130 is installed in the guide part 114 to be reciprocally movable in the second direction between an open position as shown in FIG. 7A and a closed position as shown in FIG. 7B. The door 130 opens and closes the slot 113. That is, when the wire is to be inserted into the slot 113 or the inserted wire is to be removed from the slot 113 or to be position-adjusted, the door 130 is opened. However, when the wire is to be ligated in the slot 113, the end of door 130 is located on the slot 113.

Here, an installation groove 130a is formed to be recessed on the lower surface of the door 130 to a predetermined depth. A main part of the clamper 150 is installed in the installation groove 130a.

The bracket body 110 and the door 130 may be made of a ceramic material.

The clamper 150 is installed between the bracket body 110 and the door 130. The clamper 150 prevents the door 130 from being dislodged from the open position or the closed position, and while a predetermined force is applied to the door 130 in the second direction, the clamper 150 is elastically deformed when the position of the door 130 is changed between the open position and the closed position. The clamper 150 may include a coupling pin 151 and an elastic loop 155. The coupling pin 151 is installed on the bracket body 110 so that one end protrudes onto the guide part 114. That is, a coupling hole 115a is formed in the bracket body 110 so as to penetrate from the bottom surface 115 toward the guide part 114. In addition, the is inserted and fastened into the coupling hole 115a.

The elastic loop 155 is installed on one surface of the door 130 facing the guide part 114, and may be formed in a hollow single closed curve. The elastic loop 155 is inserted and installed in the installation groove 130a formed on the inner surface of the door 130 to a predetermined depth. Therefore, the elastic loop 155 moves together with the door 130 when the door 130 moves in the opening/closing direction. An end of the coupling pin 151 is inserted into the elastic loop 155. Here, since the coupling pin 151 is fixedly installed on the bracket body 110, the elastic loop 155 moves relative to the coupling pin 151 when the door 130 is opened and closed.

Referring to FIGS. 5 and 6, the elastic loop 155 may include a parking part 155a and a neck part 155b. The parking part 155a is a place where the coupling pin 151 is positioned in the open position and the closed position of the door 130, and may be separated into at least two spaces. That is, the inner diameter of the parking part 155a is formed to be equal to or larger than the diameter of the coupling pin 151, so that elastic deformation of the elastic loop 155 by the coupling pin 151 located in the parking part 155a can be minimized. The inner diameter of the parking part 155a is formed to be equal to or larger than the diameter of the coupling pin 151, and thus elastic deformation of the elastic loop 155 can be minimized by the coupling pin 151 located in the parking part 155a. In FIGS. 5 and 6, the parking part 155a is shown to have two spaces by way of example, but the present invention is not limited thereto. The parking part 155a may consist of three or more spaces disposed to be spaced a predetermined interval apart from each other. In addition, the shape of the inner curve of the parking part 155a may be adjusted.

In this case, depending on the degree of curve and which one among the plurality of parking parts 155a the coupling pin 151 is positioned on, the degree and level of opening/closing of the door may be adjusted.

The number of parking part 155a formed may be 5 or less. If 5 or more parking parts 155a are formed, the door 130 may be elongated. Accordingly, the foreign body feel and drop-out rate of a product may increase, which may lower the treatment efficiency.

The neck part 155b is positioned between the plurality of parking parts 155a, and is elastically deformed during the opening/closing operation of the door 130. That is, the inner width of the neck part 155b is smaller than the diameter of the coupling pin 151. Accordingly, when the coupling pin 151 is relatively moved from one parking part to another parking part, the neck part 155b is elastically deformed so that a movement space of the coupling pin 151 is formed.

In the elastic loop 155, which is elastically deformed in the process of opening and closing the door 130, the direction in which the deformation load applied to the material such as tension/compression is received is as shown in FIG. 6. That is, inside the parking part 155a, the direction in which the deformation load is applied is directed toward the outside, like the direction in which the elastic loop is deformed, and outside the parking part 155a, the direction in which the deformation load is applied is directed is opposite to the direction in which the elastic loop is deformed. In addition, in the case of the closed curved elastic loop 155, since the direction in which the deformation load is applied forms a symmetrical structure, when the door is opened and closed, the elastic recovery performance of the elastic loop 155 may not be significantly deteriorated during the elastic deformation and restoration process. Therefore, the door opening and closing function may be prevented from being lost, or even if the door opening and closing function is lost, the probability of loss in the door opening and closing function may be significantly reduced.

The elastic loop 155 may be formed to have a height (H) of 3 mm or less. Here, when the height of the elastic body is greater than 3 mm, the overall height of a product is increased, thereby increasing the foreign body feel and drop-off rate of the product.

In addition, the elastic loop 155 may have a thickness smaller than that of the conventional leaf spring shown in FIG. 2. When the size of the elastic loop 155 is reduced and the thickness thereof is made thin, the installation groove 130a of the door 130 may be formed to be small, and thus the relative volume of the door 130 is increased. Accordingly, the strength of door 130 made of a ceramic material may be increased.

The elastic loop 155 may be formed to a thickness in the range of 50 μm to 1 mm. Here, if the thickness is less than 50 μm, a sufficient elastic force may not be provided, and thus an elastic holding force enough to operate the door 130 may not be provided. However, if the thickness is greater than 1 mm, it may be difficult to move the door 130 due to an excessive elastic holding force. In addition, since the volume of the door 130 is relatively reduced due to an increase in the thickness, the strength of the door 130 may be weakened.

The elastic loop 155 may include a base material made of a plastic material; and a coating material made of a metal material coated on the base material to a predetermined thickness. Here, examples of the coating material may include rhodium (Rh), gold (Au), platinum (Pt), titanium nitride (TiN), and zirconium nitride (ZrN). The coating material may be formed to a thickness ranging from 10 nm to 2 μm. Here, if the coating thickness is less than 10 nm, the coating material may peel off during use. However, if the coating thickness is 2 μm or more, the adhesion to the base material may be lowered, and the coating material may be peeled off, and the manufacturing cost may increase.

FIG. 8 is an exploded perspective view showing a self-ligating bracket according to another embodiment of the present invention. FIG. 9A is a cross-sectional view of a door of a self-ligating bracket in an open state according to another embodiment of the present invention. FIG. 9B is a cross-sectional view of a door of a self-ligating bracket in a close state according to another embodiment of the present invention. FIG. 10 is a bottom perspective view showing a state in which an elastic loop and a cap are combined in the clamper of FIG. 8.

Referring to the drawings, a bracket 100' for self-ligating correction according to another embodiment of the present invention includes a bracket body 110, a door 130 and a clamper 250. Here, the configurations and functions of the bracket body 110 and the door 130 are substantially the same as those of the bracket body and door of the bracket for self-ligating correction according to the above-described embodiment, the same reference numerals are used, and a detailed description thereof will be omitted.

The clamper 250 prevents the door 130 from being dislodged from the open position or the closed position, and while a predetermined force is applied to the door 130 in the second direction, the clamper 250 is elastically deformed when the position of the door 130 is changed between the open position and the closed position. The clamper 250 includes a coupling pin 251, an elastic loop 255 and a cap member 257. Here, the clamper 250 differs from the clamper 150 of the self-ligating bracket according to the previous embodiment in that the former further includes a cap member 257. The cap member 257 is provided between the lower surface of the door 130 and the elastic loop 255, and covers the upper surface of the elastic loop 255. The cap member 257 may be made of an opaque material such as plastic, silicon, or ceramic. The cap member 257 may be formed in the same or similar color to the color of the door 130. Therefore, when viewed from the outside of the door 130, the cap member 257 is located on the elastic loop 255 and the coupling pin 251. Accordingly, when the bracket 110' is viewed from the outside of a tooth, the internal configuration of the clamper 250 is not visible, and thus aesthetics can be improved.

FIG. 11 is a perspective view showing a modified example of the clamper of FIG. 8.

Referring to FIG. 11, an elastic loop 355 of the clamper 350 according to the modified example is constructed such that one side thereof facing the coupling pin is open and the other side thereof is closed. That is, since the side of the elastic loop 355 facing the coupling pin is open, when the elastic loop 355 is installed on the bracket body, the end of the coupling pin is inserted into the elastic loop 355. Meanwhile, the other surface located on the side facing the door of the elastic loop 355 is constructed to be closed by a cap part 357. Here, the cap part 357 may be integrally formed with the elastic loop 355. In this case, the volume of the elastic loop 355 under the load may increase. Moreover, since the amount of elastic deformation of the elastic loop 355 is reduced when elastically deformed by the coupling pin by forming the cap part 357, the occurrence of defects may be reduced.

FIGS. 12A and 12B are perspective views showing another modified example of the clamper of FIG. 8 in different directions.

Referring to the drawings, the clamper 450 another modified example is constructed such that one side of an elastic loop 455 is open and the other side thereof is closed, as described above with reference to FIG. 11. A slit 456 cut by a predetermined length along the side of the elastic loop 455 may be formed on at least one side of the elastic loop 455. Here, the amount of elastic deformation of the elastic loop configured as shown in FIG. 11 may be adjusted by adjusting the width and length of the slit.

The above-described embodiments are merely exemplary, and various modifications and equivalent other embodiments are possible by a person skilled in the art to which the present invention pertains. Therefore, the true technical protection scope of the present invention should be determined by the technical spirit of the invention set forth in the claims.

What is claimed is:

1. A bracket for self-ligating correction comprising:
   a bracket body having a slot into which a wire is inserted and formed in a first direction extending from a first side to a second side of the bracket body, and a guide part formed in a second direction crossing the first direction;
   a door reciprocally installed on the guide part of the bracket body to open and close the slot; and
   a clamper that moves the door while elastically deforming when a predetermined force is applied to the door in the second direction,
   wherein the clamper comprises:
   a coupling pin installed on the bracket body so as to allow one end to protrude onto the guide part; and
   an elastic loop installed on one side of the door facing the guide part and formed in a hollow single closed curve that the one end of the coupling pin is received in the elastic loop when the door is installed on the bracket body,
   wherein the elastic loop comprises a parking part separated into at least two spaces; and a neck part that is located between the spaces of the parking part and is elastically deformed during relative motion between the coupling pin and the elastic loop as the door is moved to and from open and closed positions,
   wherein the inner width of the neck part is smaller than the diameter of the coupling pin so that the neck part is elastically deformed along the first direction when the coupling pin is relatively moved from one parking part to another parking part as the door is moved to and from the open and closed positions.

2. The bracket for self-ligating correction of claim 1, wherein the elastic loop is formed to a height of 3 mm or less.

3. The bracket for self-ligating correction of claim 1, wherein the elastic loop is formed to a thickness in the range of 50 μm to 1 mm.

4. The bracket for self-ligating correction of claim 1, wherein the elastic loop comprises: a base material made of a plastic material; and a coating material made of a metal material coated on the base material to a predetermined thickness.

5. The bracket for self-ligating correction of claim 4, wherein the coating material is formed to a thickness ranging from 10 nm to 2 μm.

* * * * *